Figure 1:
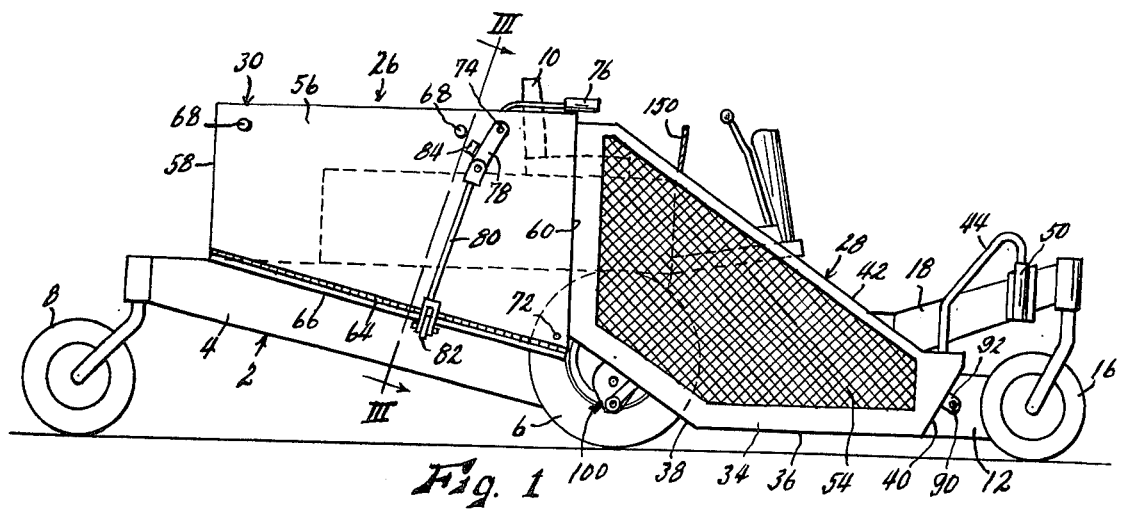

United States Patent [19]

Mullet et al.

[11] 4,103,477
[45] Aug. 1, 1978

[54] GRASS AND LEAF COLLECTOR AND COMPACTOR ATTACHMENT FOR MOWERS

[75] Inventors: David Mullet, Hesston; Raymond J. Rilling, Moundridge; Elmer D. Voth, Newton, all of Kans.

[73] Assignee: Excel Industries, Inc., Hesston, Kans.

[21] Appl. No.: 781,336

[22] Filed: Mar. 25, 1977

[51] Int. Cl.$^2$ ............................................. A01D 35/22
[52] U.S. Cl. ........................................ 56/202; 56/6; 56/16.6; 56/14.5; 56/503
[58] Field of Search ................... 56/6, 202, 14.5, 16.6, 56/503, 203, 206, 344, 363, 364, 341, 503; 198/737, 740, 741; 130/22 R

[56] References Cited
U.S. PATENT DOCUMENTS

| | | | |
|---|---|---|---|
| 999,585 | 8/1911 | Otto, Jr. | 56/363 |
| 1,353,586 | 9/1920 | Hartman | 56/363 |
| 2,572,180 | 10/1951 | Morrison | 56/344 X |
| 3,222,853 | 12/1965 | Michael | 56/202 |
| 3,736,736 | 6/1973 | Myers | 56/202 |
| 3,791,118 | 2/1974 | Behrens | 56/202 |

Primary Examiner—Russell R. Kinsey
Attorney, Agent, or Firm—John A. Hamilton

[57] ABSTRACT

A grass and leaf collector and compactor attachment for lawn mowers consisting of a chute adapted to be mounted at the side of a mower hood to receive mower cuttings ejected from the hood in the lower end thereof, the chute angling upwardly into a hopper also adapted to be mounted on the mower, and a paddle bar extending generally longitudinally through the chute and having paddles secured transversely thereto at intervals along its length. The paddle bar is driven in a vertical orbital path by a special driving connection to a ground-engaging wheel of the mower, so as to impel cuttings received in the lower end of the chute upwardly through the chute into the hopper. The driving connection includes a special safety clutch operable to be disengaged automatically in the event of any substantial obstruction to movement of the paddle bar, so as to prevent damage. The hopper is at a sufficient elevation above ground level that its contents may be dumped by dropping the floor thereof.

10 Claims, 10 Drawing Figures

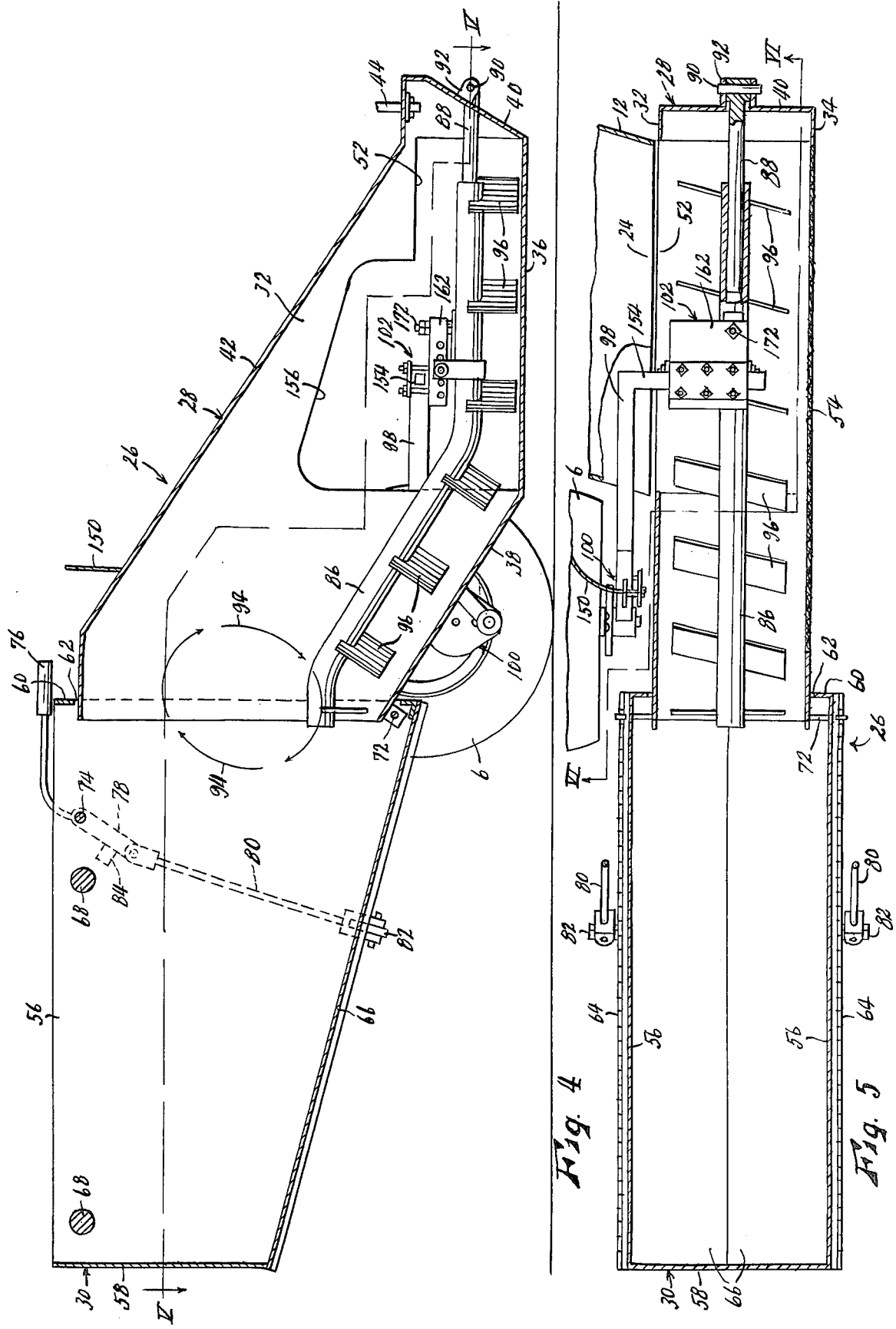

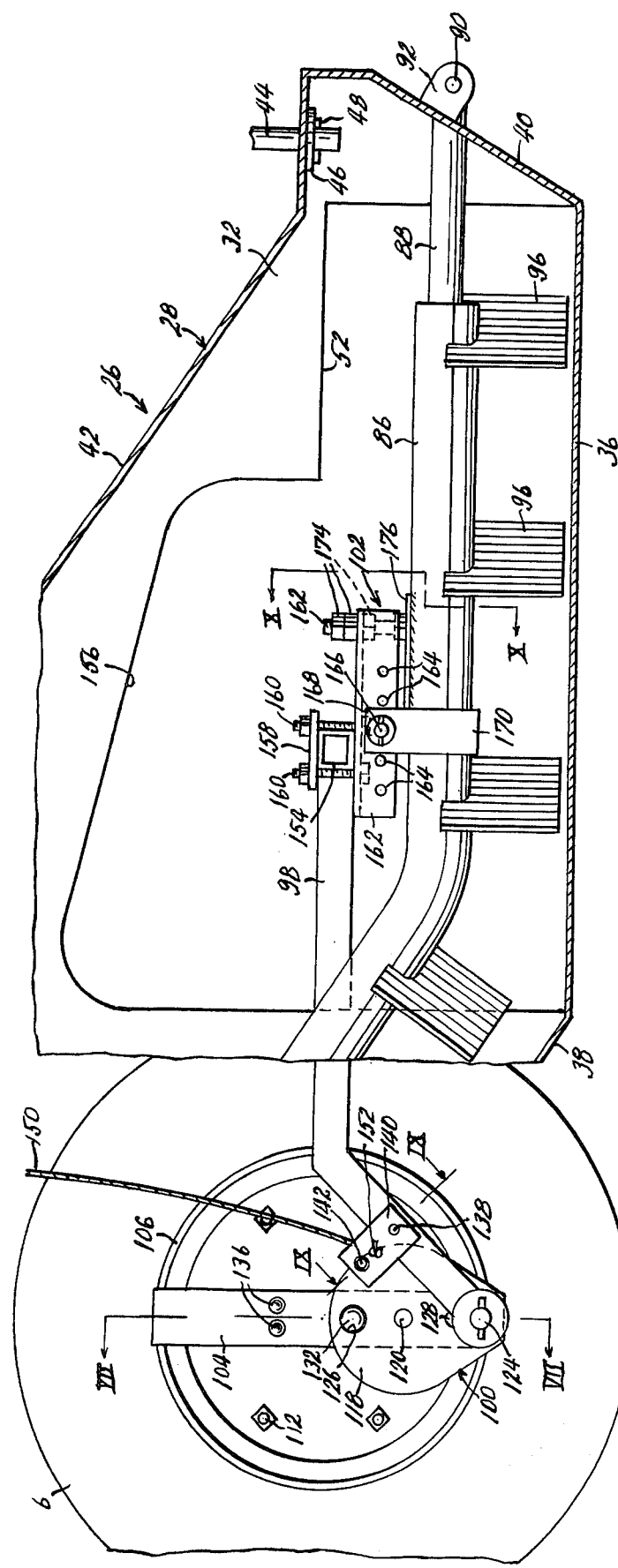

GRASS AND LEAF COLLECTOR AND COMPACTOR ATTACHMENT FOR MOWERS

This invention relates to new and useful improvements in power mowers for large lawns and the like, and has particular reference to a grass or cuttings catcher and collector attachment for such mowers, being an improvement over the device shown in our prior copending application Ser. No. 677,408, now U.S. Pat. 4,069,649 filed Apr. 15, 1976.

There is an ever increasing demand for lawn mower attachments, particularly for large, self-propelled mowers, which will collect, store, and permit remote disposal of the grass cuttings, leaves and the like thrown up from the ground by the mower action, and several attachments for this purpose have been offerred. However, all such devices within our knowledge have been subject to certain disadvantages and shortcomings. Most of such devices have involved the use of a large, powerful, "vacuum cleaner" device, including a high-capacity, power driven blower, operable to suck the cuttings emerging from beneath the mower hood into a conduit or tube, and to deliver them through said conduit to a "collection box" from which the air may esacpe through apertures too small to pass the cuttings, so that the collection box gradually fills with said cuttings. The disadvantages of this concept are both noise and dust pollution of the surrounding areas, in that blowers sufficiently powerful to perform effectively are virtually inevitably quite noisy, producing a loud roaring noise, and in that the large volume of air which must be continuously exhausted to the surrounding atmosphere often contains large quantities of dust.

Accordingly, the primary object of our prior application above identified was the provision of a catcher and collector in which the cuttings were delivered to the collection hopper by means almost totally independent of high velocity air currents, and which hence was relieved of the undesirably noise and dust pollution characteristics of prior devices. To this end, the device consisted essentially of a chute adapted to receive the cuttings in one end thereof and connected at its opposite end into the collection hopper, said cuttings being impelled through the chute into the hopper by one or more "paddle bars" extending longitudinally through the chute and having transversely arranged paddles secured thereto at intervals along their lengths. The paddle bars were moved by suitable power means in a vertical orbital path, so that the paddles moved toward the hopper in close juxtaposition to the chute floor in the lower portions of their orbits, whereby to impel the cuttings mechanically toward the hopper, and moved oppositely in well-spaced relation above the chute floor in the upper portions of their orbits.

One of the primary objects of the present invention is the provision of an improved driving means for the paddle bar as described above, wherein said paddle bar is driven directly from a ground-engaging drive wheel of the mower itself. This of course eliminates any necessity of a separate prime mower for operating the attachment, and transfers the orbital movement of a point of said wheel eccentric to its axis directly to the paddle bar to provide the desired orbital movement of the latter.

One advantage of the paddle bar delivery of the cuttings is that it is fully operable to pack the cuttings into the hopper very tightly, even if the hopper is open at its top. This increases the capacity of a hopper of any given size, and also provides that the "block" of cuttings, when removed from the hopper, may be tied in fully cohesive bales, for more efficient disposal. However, this results in the fact that when the hopper is full, the cuttings themselves may impede the motion of the paddle bar so greatly as to cause damage to the paddle bar or its driving means. The accidental entry of a rock, heavy stick, board or other solid foreign object into the chute could similarly impede the motion of the paddle bar and cause damage. Accordingly, another important object of the present invention is the provision of a novel clutch in the driving connection between the mower drive wheel and the paddle bar, said clutch being operable to release automatically whenever motion of the paddle bar is blocked by any cause, and thereby to prevent damage to the parts.

A further object is the provision of a manual operating means for engaging and disengaging said clutch, whereby it may be re-engaged after the obstruction to paddle bar motion has been removed, and whereby the collector attachment may be operated only when desired.

Other objects are simplicity and economy of construction, and efficiency and dependability of operation.

Figure 2:
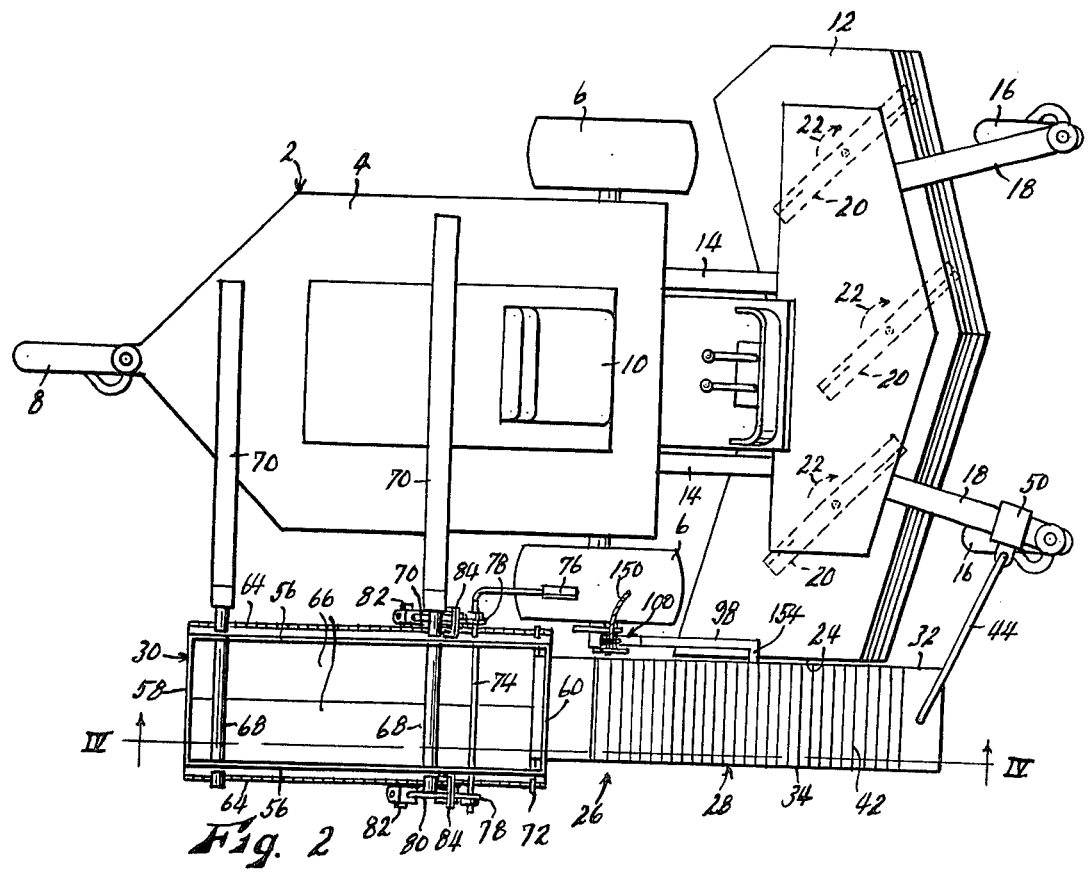
Figure 3:
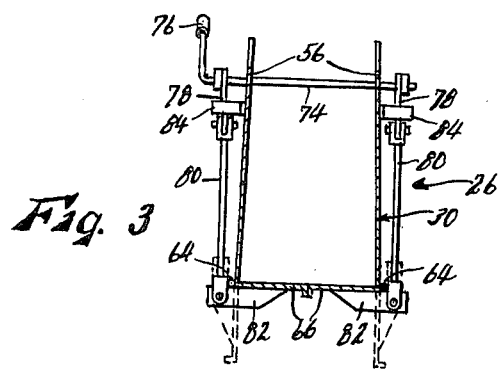

With these objects in view, as well as other objects which will appear in the course of the specification, reference will be had to the accompanying drawing, wherein:

FIG. 1 is a side elevational view of a power mower showing a grass and leaf collector attachment embodying the present invention operatively mounted thereon, FIG. 2 is a top plan view of the elements as shown in FIG. 1, FIG. 3 is a sectional view of the hopper portion of the device, taken on line III—III of FIG. 1, showing the bottom doors of the hopper closed in solid lines and open in dotted lines, FIG. 4 is an enlarged, fragmentary sectional view taken on line IV—IV of FIG. 2, FIG. 5 is a fragmentary sectional view taken on line V—V of FIG. 4, FIG. 6 is an enlarged, fragmentary sectional view taken on line VI—VI of FIG. 5, FIG. 7 is a fragmentary sectional view taken on line VII—VII of FIG. 6, rotated to a horizontal position, with parts left in elevation and partially broken away, and showing the clutch in its engaged position, FIG. 8 is a view similar to FIG. 7, but showing the clutch in its disengaged position, FIG. 9 is an enlarged fragmentary sectional view of the manual clutch operating means, taken on line IX—IX of FIG. 6, and FIG. 10 is a fragmentary sectional view taken on line X—X of FIG. 6.

Like reference numerals apply to similar parts throughout the several views, and the numeral 2 applies generally to a self-propelled, power driven mower of a not uncommon type. Said mower includes a body 4 supported at its forward end by a pair of ground-engaging drive wheels 6 disposed respectively at opposite sides thereof, and at its rearward end by a castered ground-engaging central wheel 8. Said body carries a power plant, not shown, controlled by an operator sitting on seat 10, to turn wheels 6 to propel the mower. The mower is steered by turning wheels 6 at unequal rates. Disposed forwardly of body 4 is a downwardly opening mower hood 12, said hood being connected to body 4 by vertically pivotable levers 14 (see FIG. 2), and supported slightly above ground level by a pair of castered ground-engaging wheels 16 disposed forwardly and adjacent respectively opposite sides thereof, each of wheels 16 being carried by a boom 18 affixed to and extending forwardly from hood 12. Wheels 16 maintain the hood at a generally uniform elevation above ground level, even on rough terrain, by allowing levers 14 to pivot vertically relative to body 4.

Disposed beneath hood 12 are one or more rotary blades 20, as indicated in FIG. 2, each blade being carried by the hood for rotation about a vertical axis at its midpoint, and being rotatably driven in the direction of arrows 22 by the power plant carried by body 4, there being a driving connection therebetween, not shown, whereby to cut the grass of the ground over which the hood is advanced at a uniform elevation above ground level.

This showing and description of mower 2 is of course sketchy and incomplete, but further details thereof are not pertinent to the present invention. Virtually all mowers of this type tend to throw the cuttings severed by the blades, as well as leaves, twigs and other debris sucked upwardly from the ground by the upward air currents generated by rotation of the blades, laterally to one side of hood 12, that side thereof toward which the forward ends of blades 20 move as said blades rotate. This causes a general characteristic of such mowers of depositing the cuttings in a "windrow" along one side of the path of travel of the mower, if the cuttings are not collected and removed. This is not a desirable characteristic, since the windrows are not only unsightly, particularly after the material dries and turns brown, but also they may be so thick as actually to inhibit further growth of the lawn therebeneath. As shown, mower 2 expels the cuttings from under the hood at the right side, when facing forwardly. As shown in FIG. 5, the right side of hood 12 is completely open, as indicated at 24.

The collector and compactor attachment forming the subject matter of the present invention is indicated generally by the numeral 26, and includes a chute 28 and a hopper 30, disposed in respectively fore and aft relation along the right side of the mower. Chute 28 includes an inner side wall 32 and an outer side wall 34, both vertically disposed in spaced apart relation, a floor the forward portion 36 of which is horizontal and the rearward portion 38 of which is inclined upwardly and rearwardly, a front wall 40 of abbreviated height rising from the forward end of floor section 36, and a top wall 42 the major portion of which is inclined upwardly and rearwardly, generally parallel to floor section 38. The forward end of the chute is supported by a hanger rod 44 extending downwardly through top wall 42 closely adjacent its forward end and secured therein by a washer 46 and cotter pin 48 (see FIG. 6). The opposite end of the hanger rod is mounted in a bracket 50 secured to boom 18 of the right front wheel 16. This mounting permits vertical pivoting of the chute. The rearward end of the chute if supported by means to be described. Floor section 36 of the chute is thus supported in closely spaced relation above ground level, with inner side wall 32 of the chute closely adjacent or against the right side of hood 12, as shown in FIGS. 2 and 5, said side wall having an aperture 52 formed therein (see FIGS. 4, 5 and 6) which registers generally with the side opening of the hood. The outer side wall 34 of the chute, or a major portion thereof, is formed of screening, expanded metal or the like, as indicated at 54, to permit free passage of air therethrough, but not cuttings.

Hopper 30 has side walls 56 which are slightly downwardly divergent, as shown in FIG. 3, a rear wall 58, a front wall 60 having an opening 62 into which the open rearward end of chute 28 projects loosely, and an upwardly and rearwardly inclined floor consisting of a pair of doors 66 normally meeting at the longitudinal midline of the hopper, and hinged at their distal edges respectively to the lower edges of side walls 56, as indicated at 64. The hopper is supported by a pair of horizontal transverse bars 68 extending through the top edge portions of side walls 56, respectively adjacent the front and rear of the hopper, said bars being carried by brackets 70 affixed to mower body 4. The open rearward end of chute 28 extends into front opening 62 of front hooper wall 60, and is secured therein at its lower edge by a pivot pin 72 extending transversely between and journalled in side walls 56. Thus when hood 12 is raised or lowered relative to the mower body, as permitted by hood levers 14, the chute is free to pivot relative to the hopper.

The hopper bottom doors 66 may be opened or closed by means including a horizontal transverse rod 74 extending across the hopper adjacent its top and journalled in hopper side walls 56. Said rod may be turned by means of a right angled handle 76 at one end thereof, said handle being freely accessible to the operator occupying seat 10. At each side of the hopper, a crank 78 is affixed to rod 74, the free end of said crank being connected by a rigid, pivoted link 80 to a bracket 82 affixed to the bottom hopper door 66 at that side of the hopper. The pivotal connection of the link to the bracket is eccentric to the hinge 64 of the associated door. Thus by turning handle 76 in opposite directions, doors 66 may be moved between a closed position, as shown in solid lines in FIG. 3, and an open position as shown in dotted lines. As cranks 78 are turned to a position to close the doors, and move slightly past a dead center position relative to links 80, they engage stop members 84 affixed to side walls 56 of the hopper. Thus the doors 66 are releasably locked in their closed position.

Disposed in chute 28 is a paddle bar 86. Said paddle bar constitutes a tubular pipe, and extends longitudinally of chute 28 through substantially the entire length thereof. It is angled or bent intermediate its ends, its forward and rearward end portions being angled in the same degree as the forward and rearward end portions 36 - 38 of the chute floor, and its extreme rear end portion being parallel to its forward end portion. At its forward end a guide rod 88 extends coaxially and slidably therein, said guide rod extending forwardly through front wall 40 of the chute, and being pivoted on a horizontal transverse axis, as at 90, in a bracket 92 affixed exteriorly to said front wall. Thus said paddle bar may be oscillated vertically about pivot 90, and also may be moved slidably forwardly and rearwardly on its guide rod 88. When these movements are properly coordinated, as will appear, the rearward end of the paddle bar is moved in an orbital path lying in a vertical plane, as indicated by arrows 94 in FIG. 4. Affixed to the paddle bar are a series of planar sheet metal paddles 96, said paddles being spaced regularly along the length of the paddle bar, being arranged generally transversely to its axis. For reasons to appear, it is preferred that the spacing between each successive pair of paddles be somewhat less than the front-to-rear dimension of their orbital paths. As will appear, said orbital path moves in a clockwise direction as viewed in FIG. 4. The paddles extend downwardly from the paddle bar. Thus, as each paddle bar is moved in its vertical orbital path as described, it moves forwardly in the upper portion of its orbit, and rearwardly in the lower portion of its orbit. The parts are so proportioned that during the rearward movement of the paddle bars, their lower edges sweep either in actual contact with floor 36 – 38 of the chute, or in close proximity thereto. Also for a reason to be described, each paddle 96 is inclined horizontally relative to the paddle bar, so that is rearward surface faces inwardly toward mower 2, as clearly shown in FIG. 5, except the rearmost paddle, which is disposed generally in the mouth of hopper 30 and is disposed squarely at right angles to the axis of the paddle bar.

Paddle bar 86 is driven in its vertical orbital path by a pitman bar 98 which extends forwardly and rearwardly and which, generally speaking, is pivoted at its rearward end to right drive wheel 6 of the mower on an axis eccentric to said wheel, and fixed at its forward end to an intermediate point of the paddle bar. However, the rearward connection is of a special construction providing a safety clutch indicated generally by the numeral 100, and the forward connection, indicated generally by the numeral 102 is of a special construction providing useful features of adjustability.

Safety clutch 100, as best shown in FIGS. 6 – 9, includes a mounting bar 104 extending diametrically across the rim of the hub 106 of right drive wheel 6, being based at its ends on said rim and affixed thereto by any suitable means such as by a pair of arms 108 affixed thereto adjacent its ends and extending into hub 106, being affixed at their inner ends to web 110 of said hub, as by the lugs and nuts 112 which customarily secure said web to the wheel flange 114 of the drive axle 116 of the wheel. Overlying the outer surface of bar 104 is a crank plate 118, a pivot pin 120 fixed in said crank plate being engaged rotatably in a bushing 122 fixed to bar 104. Pivot pin 120 is parallel to the wheel axis, but eccentric thereto. A crank pin 124 parallel to but eccentric to pivot pin 120 is also fixed in the crank plate, and projects outwardly therefrom, the rearward end of pitman bar 98 being rotatably mounted on pin 124. The lateral spacing between pins 120 and 124 is equal to the lateral spacing between pin 120 and the wheel axis. Formed through crank plate 118 are a pair of holes 126 and 128, said holes being spaced equally but in diametrically opposed relation from pivot pin 120. At the same distance from pivot pin 120, a hole 130 is formed in bar 104, and a steel detent ball 132 is carried loosely in said hole, the diameter of said ball being slightly less than the diameter of hole 130, but greater than the thickness of bar 104, and greater than the diameters of holes 126 and 128. The ball is biased outwardly in hole 130 by a leaf spring 134 engaging it at the inner side of bar 104, and secured to said bar by rivets 136, whereby to engage in either of holes 126 or 128 of the crank plate which may be in registry therewith to form a yieldable lock against rotation of the crank plate relative to bar 104. The crank plate may however, be turned relative to the bar if sufficient relative torque is applied thereto, by camming ball 132 out of the crank plate hole in which it is engaged. The dimensions of the crank plate are such that it overlies ball 132 in all of its rotative positions relative to bar 104.

In operation, it will be seen that as mower 2 is moved forwardly by rotation of its drive wheels 6, and crank plate 118 is secured to mounting bar 104 by the engagement of detent ball 132 in hole 126 of said crank plate, this being the "engaged" position of the clutch, crank pin 124 will be disposed at its maximum eccentricity from the axis of wheel 6, and rotation of said wheel imparts a vertical circular motion to crank pin 124 and the rearward end of pitman 98. Assuming for the moment that front connection 102 of the pitman bar to paddle bar 86 is rigid, this imparts a vertical orbital movement to the paddle bar itself, as indicated by arrows 94 in FIG. 4, so that cuttings thrown into the forward end of chute 28 through opening 52 of inner side wall 32 thereof from beneath mower hood 12, by the action of mower blades 20, said cuttings are moved progressively rearwardly through the chute by paddles 96, as said paddles sweep rearwardly in close proximity to chute floor 36 – 38 during the lower portions of their orbits, then rise and move forwardly during the upper portions of their orbits. The spacing of successive paddles at distances less than the front to rear dimension of their orbits improves the cuttings propulsion by permitting each paddle to engage cuttings last moved by the next forward paddle during the next previous stroke thereof. The cuttings are delivered to chute 28 by a very strong blast of air generated by the mower blades, and if unrelieved, this air blast would blow the cuttings all the way through the chute into hopper 30, and out of the open top of the hopper. The screen 54 of outer wall 34 of the chute passes most of said air balst, but not the cuttings, to prevent this blow-through, but the horizontal inclination of the paddles, as described, deflects a portion of the air to create some rearward draft in the chute to assist in the propulsion of the cuttings therethrough. It has been found that without this draft, there is sometimes a tendency of the cuttings to collect in and clog the rearward end portion of the chute.

The cuttings are thus discharged from chute 28 into hopper 30, and as the hopper fills, it will be seen that the upward "wiping" movement of the rearmost paddle discharges the cuttings into the hopper with a rolling or tumbling action which effectively distributes said cuttings throughout the volume of the hopper, and then continues to pack or press more cuttings into the hopper after it is loosely filled. The fact that rearmost paddle 96 is disposed squarely at right angles to the paddle bar also assists in this uniform distribution and packing of the cuttings. In fact, it is capable, without raising the cuttings level appreciably above the top of the hopper, of packing the cuttings into the hopper so tightly that when hopper bottom doors 66 are opened by operation of handle 76, as previously described, the cuttings will drop therefrom in the form of a cohesive "block", which may if desired be tied as a bale for more efficient disposal thereof. The downward divergence of hopper side walls 56 permits easy egress of the packed cuttings.

The resistance to further movement of the paddle bar when the hopper is filled and compacted may become so great as to cause bending, breaking or other damage to paddles 96, expecially the rearmost paddle, or to pitman arm 98 or its connections, but clutch 100 prevents such damage. As the resistance to movement of the paddle bar increases, it reacts through the pitman arm to apply a torque to crank pin 124 tending to rotate crank plate 118 on pivot pin 120, relative to mounting bar 104. When this reactive torque has risen to a given level, predetermined by the strength of spring 134 to be higher than normal but not sufficient to result in damage to the parts, plate 118 cams detent ball 132 out of hole 126 thereof against said spring, and turns on pivot pin 120. As rotation of drive wheel 6 continues, plate 118 rotates on pin 120 for one-half of a revolution, at which time detent ball 132 snaps into engagement with hole 128 of the crank plate, arresting movement of the crank plate relative to bar 104. In this position, crank pin 124 is concentric with wheel 6, so that continued rotation of wheel 6 imparts no movement of any sort to pitman arm 98, and the paddle bar remains at rest. Thus the clutch is moved from its engaged position, as shown in FIG. 7, to its disengaged position as shown in FIG. 8.

The clutch may also be manually engaged and disengaged by an operating device as best shown in FIGS. 6 and 9. A pin 138 is inserted horizontally and transversely through pitman arm 98, and is longitudinally slidable therein. It is spaced apart from crank pin 124 by a distance less than the maximum extension of crank plate 118 from crank pin. It projects outwardly from the pitman, and is fixed at its outer end in a small vertical plate 140 normally spaced outwardly from the pitman and extending thereabove. A pin 142 parallel to pin 138 is fixed to an upright standard 144 welded at its lower edge to the pitman, and projects slidably through a hole 146 formed in plate 140. A spring 148 carried on pin 142 biases plate 140 and pin 138 outwardly so that pin 138 does not normally project inwardly of pitman 98 into the plane of crank plate 118, as shown in solid lines in FIG. 9. Thus the crank plate may, during rotation of wheel 6, pass freely by the inner end of pin 138. A cord 150 is passed freely through matching holes formed therefor in standard 144 and plate 140, parallel to pins 138 and 142, and is secured relative to plate 140 as by a knot 152 thereof. Inwardly of standard 144, said cord is extended upwardly to a position accessible to the operator occupying seat 10. When the operator pulls on said cord momentarily, it pulls plate 140 toward pitman 98 against the bias of spring 148, thereby extending pin 138 inwardly into the plane of crank plate 118, as shown in dotted lines in FIG. 9. Some time during the next revolution of wheel 6, an edge of crank plate 118 will engage pin 138, which arrests movement of said crank plate relative to the pitman, causing said crank plate to cam detent ball 132 out of either of holes 126 or 128 thereof in which it may then be engaged, and forcing said crank plate to turn on pivot pin 120 relative to mounting bar 104. After one-half turn of this relative rotation, ball 132 snaps into the other of holes 126 or 128 to complete either the engagement or disengagement of the clutch, as the case may be. Pin 138 is retracted by spring 148 when tension on cord 150 is released.

The connection 102 of the forward end of pitman 98 to paddle bar 86 is effectively rigid in normal use, but is yieldable and adjustable as will presently be described. The pitman extends forwardly from crank pin 124, externally of inner side wall 32 of chute 28, to a position aligned with aperture 52 of said side wall, where it is provided with a right angled horizontal extension 154 which projects through said aperture into said chute for attachment to the paddle bar, Aperture 52 is upwardly enlarged as indicated at 156 to permit the necessary orbital movement of pitman extension 154. Above paddle bar 86, said extension is affixed by a clamp plate 158 and bolts 160 to the top surface of a rocker plate 162. As best shown in FIGS. 6 and 10, said rocker plate has the form of an inverted channel disposed above the paddle bar and extending longitudinally thereof, with the pitman extension secured to the web thereof. Its depending flanges each have a series of longitudinally spaced apart holes 164 formed therethrough, and a horizontal, transverse pivot pin 166 is inserted through any desired matching pair of said holes. Said pivot pin is journalled in the upstanding ears 168 of a clevis 170 welded to the paddle bar. At the forward end of the rocker plate, a vertical bolt 172 is affixed for vertical adjustment therein by lock nuts 174, the head of said bolt being lowermost and bearing against a plate 176 also welded to the paddle bar. The weight of the paddle bar urges pivot pin 166 downwardly, biasing adjustment bolt 172 against plate 176 with substantial force. Thus the pitman-paddle bar connection is essentially rigid in normal use. However, it will be seen than by inserting pin 166 in selectively different pairs of holes 164, the paddle bar may be shifted forwardly or rearwardly, and that by varying the downward extension of bolt 162 the paddle bar may be raised or lowered relative to the floor 36 – 38 of the chute. By these adjustments, the paddles 96 of the paddle bar may be caused to move in the desired closely adjacent sweeping relation to the chute floor. This close sweeping relation is especially important in the propulsion of green grass cuttings through the chute, since said cuttings tend to lie in a thin mat on the floor of the chute.

Another function of connection 102 is that it may "buckle" upwardly in the event a rock or other solid foreign object should become lodged between the lower edge of any of paddles 96 and the floor of the chute. Thus the connection permits continued operation of the paddle bar in the event of such minor obstructions, which normally will be cleared automatically by such continuation of operation, without causing disengagement of clutch connection 100, the re-engagement of which requires some time and trouble.

While we have shown and described a specific embodiment of our invention, it will be readily apparent that many minor changes of structure and operation could be made without departing from the spirit of the invention.

What we claim as new and desire to protect by Letters Patent is:

1. In combination with a power propelled mower having cutting blades disposed beneath a hood and operable to eject cuttings through a side opening of said hood, and having groundengaging drive wheels at the sides thereof, said drive wheels being disposed rearwardly of said hood, an attachment for collecting said cuttings comprising:
    a. a hollow chute attached to said mower at a side thereof, having a side opening generally registering with the side opening of said hood to receive cuttings therein, and being elongated rearwardly from said side opening,
    b. a receptacle supported by said mower rearwardly of said chute, and into which the open rearward end of said chute projects,
    c. a cuttings impelling device constituting a paddle bar extending generally longitudinally through said chute, and a series of paddles affixed to said paddle bar generally transversely thereof and in spaced relation along the length thereof,
    d. mounting means for said paddle bar whereby it may be pivoted vertically about a horizontal transverse axis at the forward end of said chute, and moved longitudinally of itself within said chute, and
    e. a pitman arm connected at its forward end to said paddle bar at a point thereof spaced rearwardly from the pivotal axis thereof, said connection being normally rigid, and rotatably connected at its rearward end to the mower drive wheel at that side of the mower, on an axis parallel with but eccentric to the axis of rotation of said wheel, whereby rotation of said wheel imparts a vertical orbital movement to said paddle bar, said paddles sweeping rearwardly in close proximity to the floor of said chute in the lower portions of their orbits, and moving forwardly in spaced relation above said chute floor in the upper portions of their orbits.

2. The combination as recited in claim 1 with the addition of a yieldable clutch interposed in the connection of said pitman to said mower drive wheel, said clutch being operable to yield, whereby to terminate the driving of said pitman, whenever the operating load imposed on said pitman by said paddle bar exceeds a predetermined level.

3. The combination as recited in claim 2 with the addition of manually operable means for selectively engaging and disengaging said clutch.

4. The combination as recited in claim 2 wherein said clutch comprises:
  a. a mounting member affixed to said mower drive wheel,
  b. a crank rotatably mounted on said mounting member on an axis parallel with but eccentric to the axis of said drive wheel, the rearward end of said pitman being rotatably mounted on said crank on an axis parallel with but eccentric to the crank axis, the eccentricity of said pitman on said crank being equal to the eccentricity of said crank relative to said drive wheel, whereby at one point in the rotation of said crank relative to said mounting member the connection of said pitman to said crank is coaxial with said drive wheel, and
  c. an automatically engaging detent carried by said mounting member and operable to secure said crank yieldably against rotation relative to said mounting member in either of two positions, one when said pitman connection to said crank is concentric with said drive wheel, and one when said pitman connection is at a position of maximum eccentricity relative to said drive wheel, and which permits free rotation of said crank in all other positions.

5. In combination as recited in claim 4 with the addition of manually operable means for disengaging said detent in either of its operative positions.

6. The combination as recited in claim 4 wherein said detent comprises a detent ball carried loosely in an aperture of said mounting member adjoining a surface of said crank at right angles to its axis, said crank surface overlying said ball in all positions of said crank, and having a pair of apertures formed therein in diametrically opposed relation to the crank axis, equidistantly from said axis, and in diametrically aligned relation to the connection of said pitman to said crank, both of said apertures being too small to fully admit said detent ball, and spring means biasing said detent ball yieldably toward said apertured crank surface.

7. The combination as recited in claim 6 with the addition of a clutch operating member carried movably by said pitman, and manually operable means for moving said member to a position in which it positively locks said pitman and said crank against relative rotation, whereby continued rotation of said drive wheel will cause said crank to cam said detent ball out of engagement with whichever of said crank apertures said detent ball may then be engaged.

8. The combination as recited in claim 7 wherein said clutch operating member comprises a pin disposed transversely of said pitman and carried thereby for longitudinal movement between an inoperative position out of the plane of said crank and an operative position projecting within the plane of said crank, being spaced apart from the pitman connection to said crank by a distance less than the length of said crank, and with the addition of:
  a. a spring biasing said pin to its inoperative position, and
  b. a cord connected to said pin and operable by tension thereon to move said pin to its operative position.

9. The combination as recited in claim 1 wherein the forward end of said pitman is connected to said paddle bar by means comprising:
  a. a rocker plate pivoted to said paddle bar for movement on a horizontal transverse axis, and disposed above said paddle bar, said pitman being rigidly affixed to said rocker plate,
  b. a vertical stop member affixed in said rocker plate forwardly of its pivotal axis, with its lower end abutting said paddle bar and urged into engagement therewith by the weight of said paddle bar.

10. The combination as recited in claim 9 wherein said stop member is vertically adjustable relative to said rocker plate, and wherein said rocker plate is forwardly and rearwardly adjustable relative to said paddle bar.

* * * * *